United States Patent
Dedieu

(10) Patent No.: US 9,866,559 B2
(45) Date of Patent: Jan. 9, 2018

(54) METHOD FOR OPENING A SESSION OF A MACHINE BELONGING TO A MACHINE SET

(75) Inventor: Gérard Dedieu, Montigny le Bretonneux (FR)

(73) Assignee: EVIDAN, Les Clayes sous Bois (FR)

( * ) Notice: Subject to any disclaimer, the term of this patent is extended or adjusted under 35 U.S.C. 154(b) by 406 days.

(21) Appl. No.: 13/695,649

(22) PCT Filed: Apr. 29, 2011

(86) PCT No.: PCT/EP2011/056831
§ 371 (c)(1),
(2), (4) Date: Jan. 9, 2013

(87) PCT Pub. No.: WO2011/138240
PCT Pub. Date: Nov. 10, 2011

(65) Prior Publication Data
US 2013/0212647 A1  Aug. 15, 2013

(30) Foreign Application Priority Data

May 3, 2010 (FR) ..................... 10 53429

(51) Int. Cl.
*G06F 21/00* (2013.01)
*H04L 29/06* (2006.01)
(Continued)

(52) U.S. Cl.
CPC ............ *H04L 63/10* (2013.01); *G06F 21/305* (2013.01); *H04L 67/14* (2013.01)

(58) Field of Classification Search
None
See application file for complete search history.

(56) References Cited

U.S. PATENT DOCUMENTS 6,748,420 B1 * 6/2004 Quatrano et al. ............. 709/205
7,487,248 B2 * 2/2009 Moran ................... H04L 67/14
                                                                  709/206
(Continued)

OTHER PUBLICATIONS

International Search Report as issued for PCT/EP2011/056831.
(Continued)

*Primary Examiner* — Maung Lwin
(74) *Attorney, Agent, or Firm* — Pillsbury Winthrop Shaw Pittman LLP

(57) ABSTRACT

A method for opening a session of a first machine using a session checking service for the first machine and a second machine, including a security service, includes receiving a request to open a session on the first machine, the request including a user identification information item; verifying that the identification information item is associated with an identification data item of the second machine in a repository; checking that the user has the right to open the session on the first machine; if the verification and check are positive, sending a session status modification request of the second machine to the security service of the second machine; if the session status of the second machine is modified, sending a request to authorize opening of the session to the first machine; and storing the identification information item associated with an identifying data item of the first machine in the repository.

16 Claims, 9 Drawing Sheets

(51) Int. Cl.
*G06F 21/30* (2013.01)
*H04L 29/08* (2006.01)

(56) References Cited

U.S. PATENT DOCUMENTS

| | | | |
|---|---|---|---|
| 7,856,660 B2* | 12/2010 | Lagimonier | H04L 63/04 713/170 |
| 8,181,206 B2* | 5/2012 | Hasek | H04N 7/17318 725/114 |
| 2002/0129142 A1* | 9/2002 | Favier et al. | 709/225 |
| 2003/0005121 A1* | 1/2003 | Washio | G06F 17/30575 709/225 |
| 2004/0143669 A1* | 7/2004 | Zhao et al. | 709/228 |
| 2005/0080906 A1 | 4/2005 | Pedersen | |
| 2005/0256898 A1* | 11/2005 | Akagawa | G06F 17/30079 |
| 2006/0031779 A1* | 2/2006 | Theurer et al. | 715/781 |
| 2006/0277536 A1 | 12/2006 | Stein et al. | |
| 2007/0162605 A1 | 7/2007 | Chalasani et al. | |
| 2007/0169175 A1 | 7/2007 | Hall et al. | |
| 2008/0183817 A1* | 7/2008 | Baek et al. | 709/204 |
| 2008/0298307 A1* | 12/2008 | Ohman | H04L 65/1083 370/328 |
| 2009/0083830 A1* | 3/2009 | Lum | H04L 63/20 726/1 |
| 2009/0100266 A1* | 4/2009 | Abe | H04L 63/0861 713/175 |
| 2009/0172101 A1* | 7/2009 | Arthursson | 709/205 |
| 2009/0210536 A1* | 8/2009 | Allen | H04M 3/58 709/227 |
| 2009/0249448 A1* | 10/2009 | Choi | H04L 63/0815 726/4 |
| 2009/0271848 A1* | 10/2009 | Leung | H04L 65/4015 726/6 |
| 2010/0017334 A1* | 1/2010 | Itoi | G06Q 20/02 705/71 |
| 2010/0162367 A1* | 6/2010 | LaJoie | G06Q 30/0256 726/4 |
| 2010/0205642 A1* | 8/2010 | Foti | H04N 21/2181 725/109 |
| 2010/0215036 A1* | 8/2010 | Eom | H04L 51/36 370/352 |
| 2010/0242045 A1* | 9/2010 | Swamy | G06F 9/455 718/104 |
| 2011/0243553 A1* | 10/2011 | Russell | G06Q 30/0631 398/25 |

OTHER PUBLICATIONS

Anonymous; "Symantec pcAnywhere Solution User Guide Version 12.5", Feb. 25, 2010, pp. 1-63, XP002607050, Symantec Retrieved from the Internet:URL:http://www.symantec.com/business/support/index?page=content&id=DOC1799>.

* cited by examiner

METHOD FOR OPENING A SESSION OF A MACHINE BELONGING TO A MACHINE SET

CROSS REFERENCE TO RELATED APPLICATIONS

This application is the U.S. National Stage of PCT/EP2011/056831, filed Apr. 29, 2011, which in turn claims priority to French Patent Application No. 1053429, filed May 3, 2010, the entire contents of all applications are incorporated herein by reference in their entireties.

TECHNICAL FIELD OF THE INVENTION

The present invention relates to a method for opening a session of a first machine using session checking means.

It is applicable particularly, but not exclusively, in the field of medical care institutions.

TECHNICAL BACKGROUND OF THE INVENTION

A method for opening a session of a first machine using session checking means, known to one skilled in the art, enables a session to be opened by a user with his user identifier (commonly referred to as "login"), which generally consists of a user name and associated password.

In the field of medical care institutions, it is common to use a machine set comprising a plurality of machines. The various machines are equipped with common applications, and a machine may also have one or more applications that run exclusively on that machine.

Multiple operators, such as doctors or nurses, may be able to use the various machines, in order to access the common applications and the applications that run exclusively on each given machine. To access these applications, they open a session with their "login".

Thus, during the day, an operator can open a user session on several machines in the machine set.

One drawback with this state of the art is that often an operator forgets to close an open session after using the machine. Consequently, another operator is able to use the applications on the machine via a user session that is not his, and thus has access to applications for which he is not authorized.

GENERAL DESCRIPTION OF THE INVENTION

The object of the present invention is a method for opening a session of a first machine using session checking means that provide a solution to the problem described in the preceding.

This object is achieved with a method for opening a session of a first machine using session checking means for a machine set comprising at least said first machine and a second machine, said second machine comprising security means, and the method comprising the steps of:

receiving, by the session checking means, a request to open the session of said first machine, said request comprising at least one item of information identifying a user;

verifying, by the session checking means, that the at least one item of information identifying said user is associated with identification data stored in a repository on said second machine;

checking, by the session checking means, that the user has the right to open a session on the first machine;

if the verification and check are positive, sending by the session checking means a request to modify the session status of said second machine to said security service of the second machine; and if the modification of the session status of the second machine is carried out, sending by the session checking means of a request to the first machine to authorize opening of a session; and storing the at least one item of identification information for said user that is associated with an item of identifying data of said first machine in said repository by the session checking service.

As will be explained in detail in the following, the activity of verifying whether a user already has an open session of another machine and of modifying his session status before allowing him to open another session of a different machine makes it possible to render the machine the user is no longer using more secure.

According to non-limiting embodiments, the method may further comprise one or more additional characteristics from the following list:

The request to modify the session status is of the session locking or session closing type.

The type of a session status modification request is configured in the session checking means. Thus, the closure or locking of a session on the second machine is decided upstream by an administrator of the machine set.

The method comprises an additional step of sending, by the first machine to the session checking means, a configuration request including a request for the type of session status modification. Thus, the user who accesses the first machine is given the choice of locking or closing the open session on the second machine.

The method comprises an additional step of sending, by the session checking means to said security means of said second machine, a request to modify the session status of said second machine, that is of the session locking type if the modification of the session status of the second machine corresponding to a session closure fails. This enables the second machine to be rendered secure by locking the open session on that machine even if it is not possible to close the session.

A request received or transmitted by the session checking means is a TCP/IP or UDP request. This enables communication between two machines on the same computer network.

The method comprises an additional step of sending an application message to modify the session status corresponding to the session status modification request to a session management module of the second machine. This enables the session management module to lock/close the second machine.

The method comprises an additional step of sending an application message to modify the session status corresponding to the session status modification request to a session management module plugin of the second machine. This avoids modifying the session management user interface that is part of the session management module of the second machine.

The steps of verification and transmission of the session status modification request are performed for each machine that belongs to the machine and is not the first machine. This enables all machines in the machine set on which a user session is open to be rendered secure.

The invention further relates to a software product comprising one or more instruction sequences that are executable by an information processing unit, the execution of which instruction sequences enables the session opening method according to any of the preceding characteristics to be implemented when the software is loaded on a computer.

The invention further relates to a machine for managing a machine set and capable of carrying out a method a for opening a session on a first machine via session checking means for said machine set that includes at least said first machine and a second machine, said second machine comprising security means, said management machine comprising said session checking means, said session checking means being designed to:
receive a request to open a session of said first machine, said request including at least one item of identification information for a user;
verify whether said at least one item of identification information for a user is associated with an identification data item of said second machine in a repository;
check whether the user has the right to open a session on the first machine;
if said verification and check are positive, transmit to the security means of said second machine a request to modify the session status of said second machine;
if the modification of the session status of the second machine is carried out, send a request to open a session to the first machine; and
store in said repository the at least one item of identification information for said user that is associated with an item of identification data of said first machine.

The invention also relates to a computer system that is designed to carry out a session opening of a first machine via session checking means for a machine set that includes at least said first machine and a second machine, said second machine comprising security means, said system comprising:
the session checking means designed to cooperate with the first machine and the second machine, said session checking means being designed to:
receive a request to open a session on said first machine, said request comprising at least one item of information identifying a user;
verify that the at least one item of information identifying said user is associated with an item of identification data stored in a repository of said second machine;
check that the user has the right to open a session on the first machine;
if said verification and check are positive, transmit to the security means of said second machine a request to modify the session status of said second machine;
if the modification of the session status of the second machine is carried out, send a request for authorization to open a session to the first machine; and
store in said repository the at least one item of identification information for said user that is associated with an item of identification data of said first machine;
said second machine being designed to receive a request to modify a session status from the session checking means via said security means; and
said first machine being designed to:
transmit a request to open a session to said session checking means; and
if the session status of the second machine is modified, to receive a request for authorization to open a session from said session checking means.

According to a non-limiting embodiment, the session management module of the second machine comprises a plugin.

The invention and its various applications will be understood more clearly upon reading the following description and reviewing the accompanying drawing.

BRIEF DESCRIPTION OF THE DRAWING

The figures are presented for illustrative purposes only and are not intended to be limiting of the invention in any way.

FIG. 4 is a second diagrammatic representation of a computer system according to the first embodiment of FIG. 2a; and FIG. 5 is a second diagrammatic representation of a computer system according to the second embodiment of FIG. 2a.

DESCRIPTION OF EMBODIMENTS OF THE INVENTION

The method for opening a session of a first machine using session checking means for a machine set comprising at least said first machine and a second machine, said second machine comprising security means, is described in a non-limiting embodiment shown in FIGS. 1a to 1d.

Figure 2A:
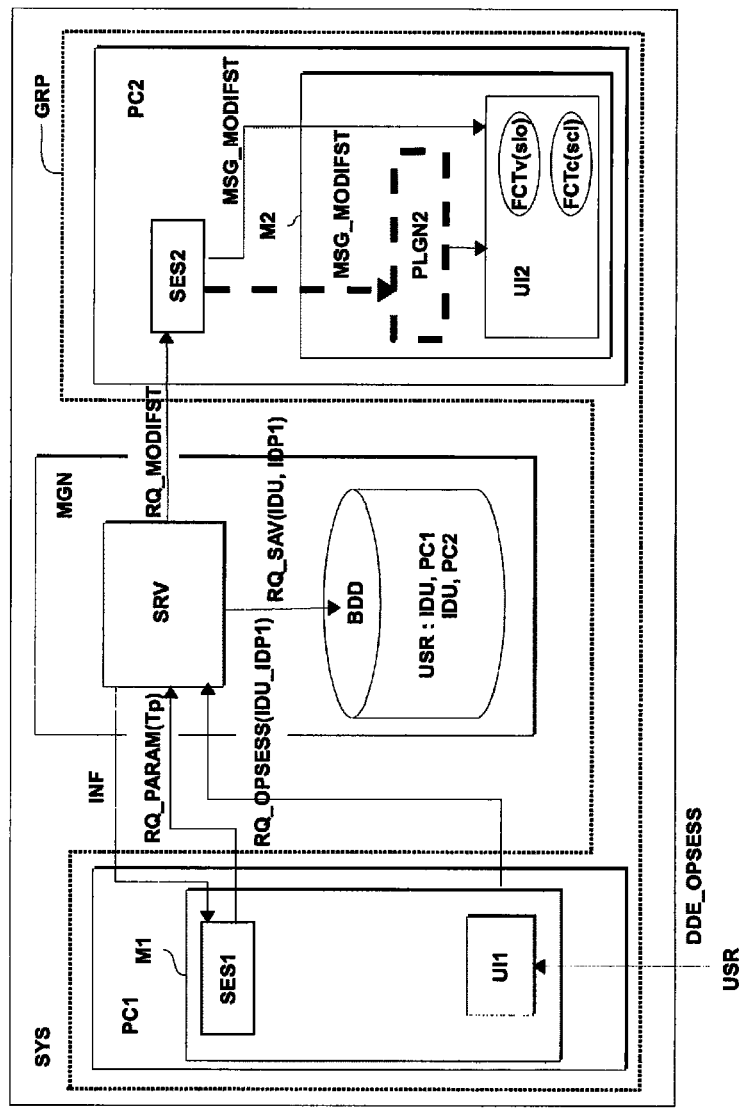
FIG. 2a is a first diagrammatic representation of a computer system according to a first embodiment, comprising a first machine, a second machine, and session checking means included in a management machine, the session checking means being capable of implementing the session opening method illustrated in FIGS. 1a to 1c.
Figure 2B:
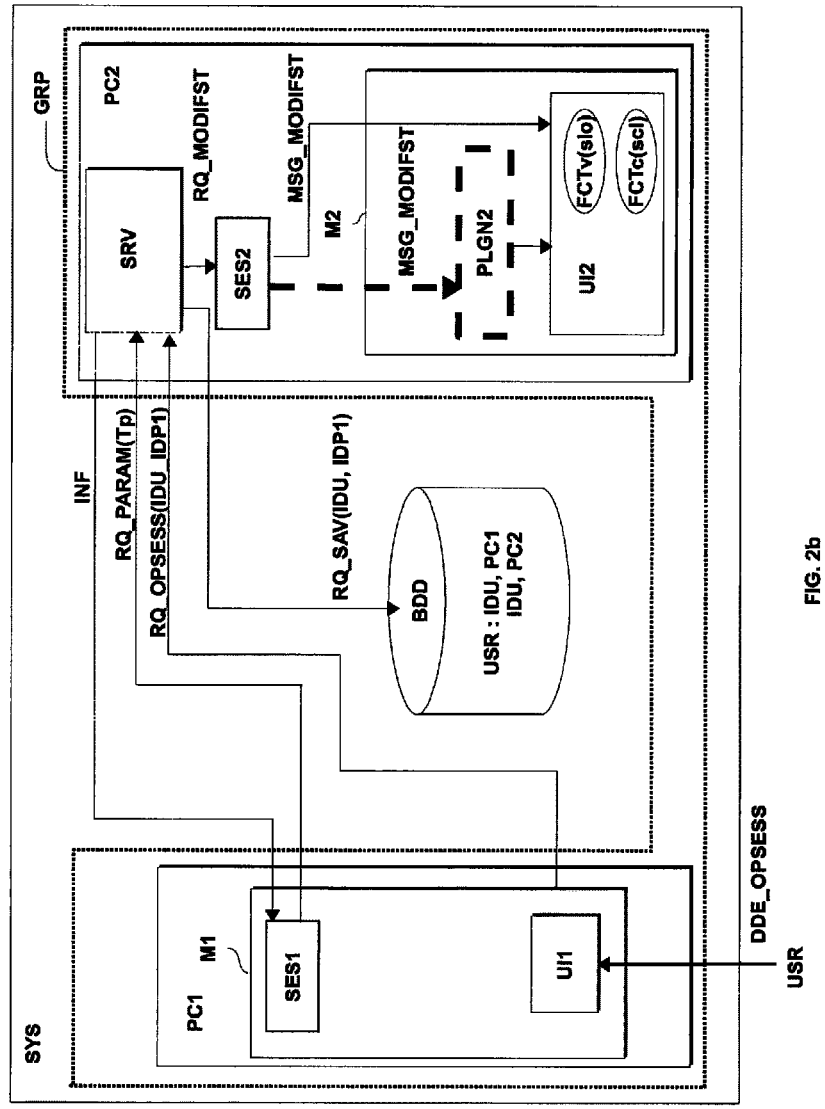
FIG. 2b is a diagrammatic representation of a computer system according to a second embodiment, comprising a first machine, a second machine, and session checking means included in the second machine, the session checking means being capable of implementing the session opening method illustrated of FIGS. 1a to 1c.

The method for opening a session is implemented by session checking means SRV shown in FIG. 2a and FIG. 2b, these session checking means SRV also being called the session checking service. In the rest of this description, the two terms will be used interchangeably. Session checking means SRV are a computer software product.

In the same way, the security means are also referred to as the security service. In the rest of this description, the two terms will be used interchangeably. The security means are a computer software product.

The term machine is understood to mean any computer equipment comprising a user interface via which a user may have himself authenticated by means of his identifier and password (commonly called "login"). In non-limiting examples, a machine may be a single workstation or a server.

In a first embodiment illustrated in FIG. 2a, this session checking service SRV is installed on a management machine MGN for the machine set. The machine set is part of a computer system SYS that also includes first machine PC1 and second machine PC2.

In a second embodiment illustrated in FIG. 2b, this session checking service SRV is installed on second machine PC2. This second embodiment makes it possible to dispense with an additional management machine MGN such as a server.

When a user USR wishes to access second machine PC2, he connects in a user session unique to him via an identifier that is unique to him and an associated password, the activity as a whole constituting the "login". The connection (also called opening a session) is established via a session management user interface UI2, which is a component of the machine's user interface (not shown).

In the rest of this description, the terms user session and session will be used interchangeably.

When the same user USR wishes to access first machine PC1, he connects in a user session that is unique to him via the same "login". The connection (also called opening a session on the machine) is established via a session management user interface UI1, which is a component of the machine's user interface (not shown).

During this attempt to connect, which corresponds to a request to open a session DDE_OPSESS on the part of the user, first machine PC1 sends a request to open a session RQ_OPSESS to session checking service SRV.

At this time, the session opening method is implemented. It comprises the following steps, as illustrated in FIG. 1.

receiving a session opening request RQ_OPSESS of said first machine PC1 by session checking service SRV, said request comprising at least one item of identification information IDU of a user USR (step RX(RQ_OPSESS(IDU, IDP1)));

verifying by session checking service SRV that said at least one item of identification information IDU of said user USR is associated in a repository BDD with an item of identification data IDU of said second machine PC2 (step VERIF_BDD(IDU, IDP2));

checking by session checking service SRV that user USR has the right to open a session on first machine PC1 (step CNTRL_RGT(USR, PC1));

if said verification and check are positive, sending by session checking service SRV of a request to modify the session status RQ_MODIFST of said second machine PC2 to said security service SES2 of said second machine PC2 (step TX(RQ_MODIFST));

if the modification of the session status of second machine PC2 is carried out, sending by the session checking service SRV of a request to authorize opening of a session RQ_OPSESSOK to first machine PC1 (step TX(RQ_OPSESSOK(IDU, IDP1)));

storing said at least one item of identification information IDU for said user USR that is associated with an item of identifying data IDP of said first machine PC1 in said repository BDD by session checking service SRV (step SAVBDD(IDU, IDP1))).

In a non-limiting embodiment, the session status modification request RQ_MODIFST is of type Tp session locking (session status locked, ST=slo) or session closure (session status closed, ST=scl).

It will be noted that locking of a machine is understood to mean the act of locking a user session that is unlocked.

In a non-limiting embodiment, the method for opening a session comprises an additional step of sending an application message for modification of the session status MSG_MODIFST corresponding to session status modification request RQ_MODIFST to a session management module M2 of second machine PC2.

In a non-limiting embodiment, the method for opening a session comprises an additional step according to which session management module M2 of second machine PC2 modifies to session status of said second machine PC2.

For the rest of the present description, in the non-limiting embodiment of the method described, the method will comprise these non-limiting embodiments.

The steps of the method for opening a session are described in detail hereinafter with reference to FIGS. 1b, 2a, 2b, 3, 4 and 5. It will be noted that FIGS. 3 and 4 refer to FIG. 2a and FIG. 5 refers to FIG. 2b. Of course, a figure similar to FIG. 3 may be used for FIG. 2b.

It will be noted that second machine PC2 includes a session management user interface UI2, which is located in a session management module M2 such as is illustrated in FIG. 2a and FIG. 2b.

In a first step 1), session checking service SRV receives a request to open a session RQ_OPSESS for said first machine PC1, said request including at least one items of identification information IDU of a user USR.

It will be noted that this identification information IDU enables identification of the originator of the request to open the session DDE_OPSESS described in the preceding. In a non-limiting example, this identification information IDU is a unique identifier associated with the user (commonly called the "Global Unique Identifier").

In non-limiting embodiments, the request to open a session RQOPSESS is a TCP/IP ("Transmission Control Protocol/Internet Protocol") or UDP ("User Datagram Protocol") request.

In a second step 2), session checking service SRV verifies whether said at least one item of identification information IDU of said user USR is associated with an item of identification data IDU of second machine PC2 in a repository BDD.

Thus, it is verified in repository BDD whether there exists a pair IDU, IDP having the same unique user identifier IDU and a machine identifier IDP that is different from first machine PC1, which in this case is that of second machine PC2.

If this is the case, this means that user USR has previously opened a session on another machine, in this case second machine PC2.

Of course, this assumes that when user USR opened the session previously on second machine PC2, session checking service SRV stored an item of user identification information IDU in repository BDD as well as an associated item of identification data IDP2 of second machine PC2.

In a non-limiting embodiment, repository BDD is managed by session checking service SRV.

In the first embodiment, in which session checking service SRV is installed on a management machine MGN, repository BDD is installed on said management machine MGN.

In the second embodiment, in which session checking service SRV is installed on second machine PC2, repository BDD is a remote repository.

It will be noted that identification data item IDP of a machine enables the associated machine to be identified uniquely. In non-limiting examples, an item of identification date IDU of a machine is its name, its IP address, or even its unique identifier, commonly called the "Global Unique Identifier".

In a third step 3), session checking service SRV checks whether user USR has the right to open a session on first machine PC1.

It will be noted that the process of checking a user's rights to open a session on a machine is known to one skilled in the art and is not described here.

In a fourth step 4), if the results of verification and checking are positive (a user session has been opened on second machine PC2 and the same user has the right to open a session on first machine PC1), session checking service SRV sends a request to modify the session status RQ_MODIFST of said second machine PC2 to said security service SES2 of said second machine PC2.

The request to modify the session status RQ_MODIFST is of type Tp session locking RQ_MODIFST(slo) or session closing RQ_MODIFST(scl).

Accordingly, the session on second machine PC2 will either be locked or it will be closed.

Figure 1A:
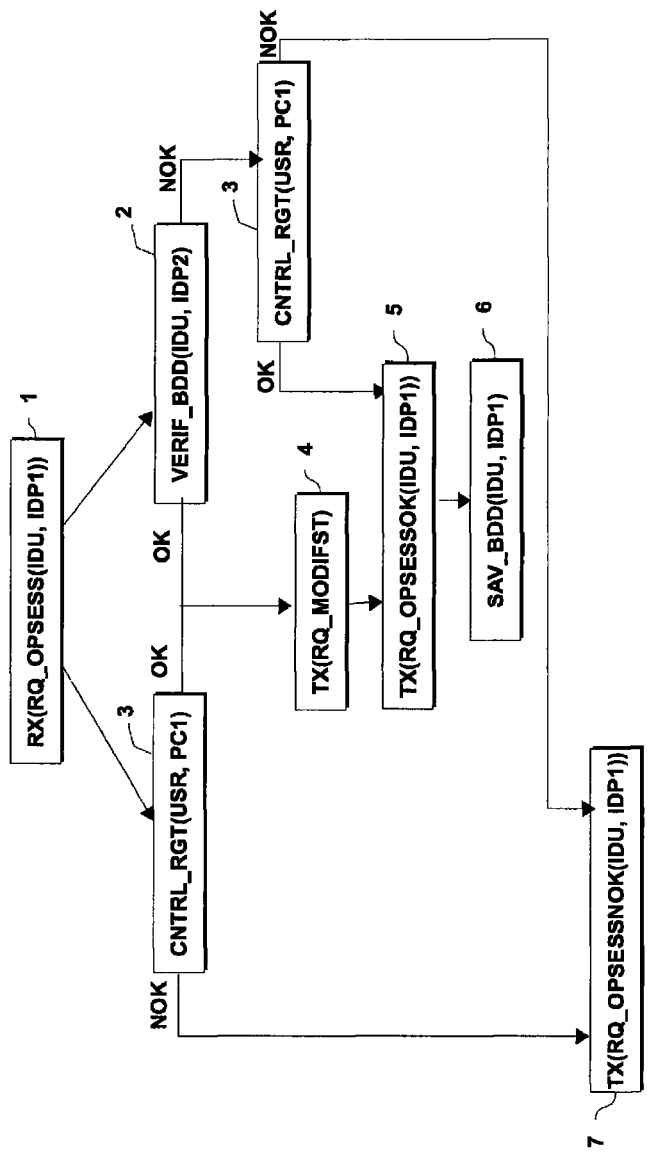
FIG. 1a is a flowchart of the method for opening a session according to a first, non-limiting embodiment of the invention.
Figure 1B:
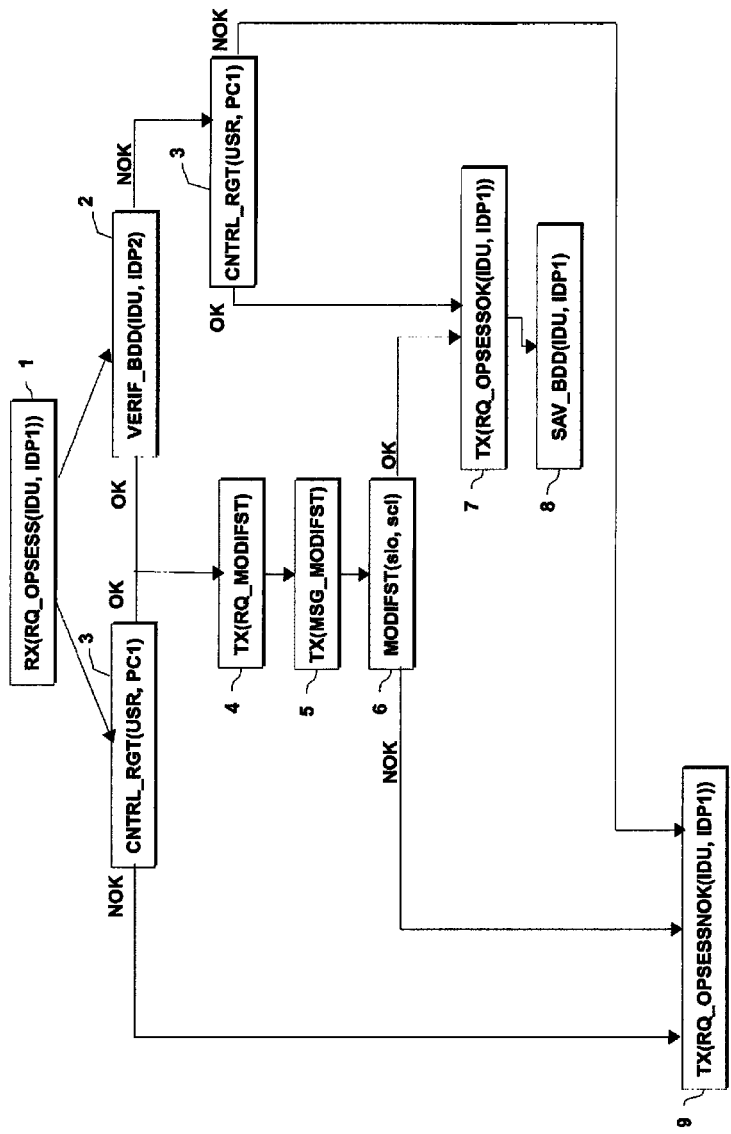
FIG. 1b is a flowchart of the method for opening a session of FIG. 1a, further comprising two additional steps.
Figure 1C:
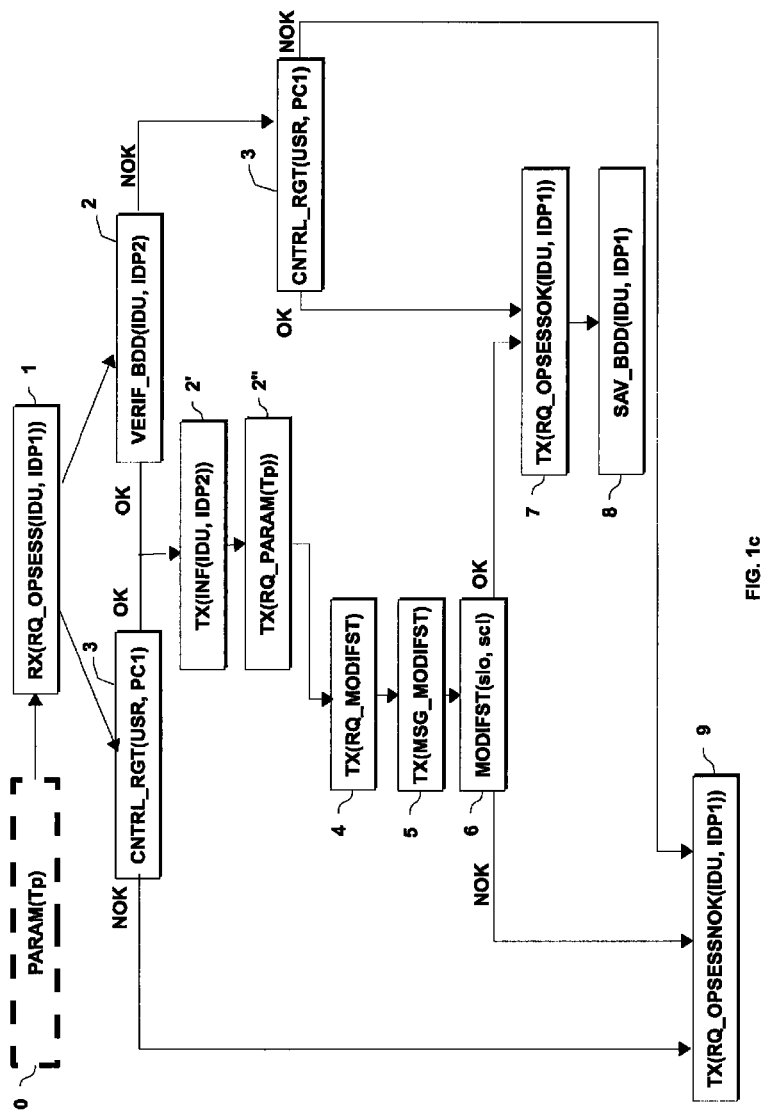
FIG. 1c is a flowchart of the method for opening a session of FIG. 1b, comprising an additional step of configuring a session modification request type.

In a non-limiting first embodiment, the type Tp of a session status modification request RQ_MODIFST is configured in session checking service SRV (step 0 called PARAM(Tp) as is indicated by the dashed lines in FIG. 1c). Accordingly, the choice between closing or locking is made when session checking service SRV is configured. This enables an administrator of the machine set GRP to determine in advance whether a session open on another machine is to be closed or simply locked.

In a second non-limiting embodiment, the choice of whether to close/lock is given to the user himself. In this way, session management user interface UI1 of first machine PC1 is designed to be able to:
  inform user USR that there is already an open session on second machine PC2; and
  offer said user USR the opportunity to choose between closing or locking the session on second machine PC2. This enables a user USR to manage his sessions that are open on machines other than first machine PC1 himself.

Thus, in this second embodiment, the method for opening a session comprises the following additional steps, as illustrated in FIG. 1c:
  if the result of verification is positive (there is an open session on second machine PC2), session checking service SRV sends a confirmation message INF to first machine PC1, confirming the existence of an open session on second machine PC2 (step 2' called TX(INF (IDU, IDP2)); and
  following the choice by user USR to close or lock the session on second machine PC2, first machine PC1 sends a configuration request RQ_PARAM to session checking service SRV that includes the type Tp of the session status modification request RQ_MODIFST (step 2" called TX(RQ_PARAM(Tp)), the type being chosen by user USR.

These two additional steps are carried out before the step of sending session status modification request RQ_MODIFST.

It will be noted that in a non-limiting embodiment first machine PC1 comprises a security service SES1 for this purpose, as illustrated in FIG. 2a and FIG. 2b, and designed to:
  receive the confirmation message INF of the existence of an open session on second machine PC2;
  send configuration request RQ_PARAM.

In non-limiting embodiments, a session status modification request RQ_MODIFST is a TCP/IP ("Transmission Control Protocol/Internet Protocol") or UDP ("User Datagram Protocol") request. In the latter case, the requests are called datagrams. The UPD communication protocol is a simple protocol that enables requests to be transmitted to another machine without a prior request to communicate. Of course, other communication protocols that enable a request to be sent between two machines may also be used.

It will be noted that security service SES2 is a task that runs in the background and operates independently of a user session, that is to say even if there is no user session. Security means SES2 are thus a computer software product that operates independently of a user session.

Accordingly, the fact that security service SES2 is autonomous with respect to session management user module M2 of second machine PC2 (session management module M2 which manages the user sessions) avoids the problem of having security service SES2 stop functioning when said session management user module M2 is no longer active, as is the case with certain operating systems (not shown in the figures), such as Windows Vista™ for example, on which said module M2 is based.

Also, it will be noted in general that the rights of a user on a machine are restricted to a given environment, and accordingly to certain actions.

Since security service SES2 is independent of the user session, session management user interface UI2 does not have the same rights as said security service SES2 and therefore does not have access to the actions performed by security service SES2.

The notes provided in the preceding with regard to security service SES2 of second machine PC2 also apply to security service SES1 of first machine PC1.

It will be noted that if the verification carried out the second step is negative (a session has not been opened on second machine PC2), the third step is still carried out (as shown in FIGS. 1a to 1d). In fact, the rights of user USR to open a session on first machine PC1 must still be checked. Steps 7) and 8) as described in the following are also carried out.

Also, it will be noted that if the check carried out in the third step is negative (the user does not have the necessary rights to open a session on first machine PC1), session checking service SRV sends a request to prohibit opening of a session RQ_OPSESSOK to first machine PC1 (ninth step TX(RQ_OPSESSNOK(IDU, IDP1), shown in FIGS. 1a to 1d).

Upon receipt of session status modification request RQ_MODIFST by the security service SES2 of second machine PC2, in a fifth step 5), as shown in FIGS. 1b, 1c, 1d or FIG. 3, said security service SES2 sends a session status modification application message MSG_MODIFST corresponding to the session status modification request RQ_MODIFST to session management module M2 of second machine PC2.

It will be noted that a session status modification application message MSG_MODIFST is an application message that is defined on the basis of session management module M2 of second machine PC2, and more particularly on the basis of session management user interface UI2.

Thus for example, in the case of a Windows™ session management user interface, a session status modification message is a notification generated by. Windows. In another example, in the case of a Linux™ session management user interface, a session status modification message is an event generated by Linux™.

Figure 3:
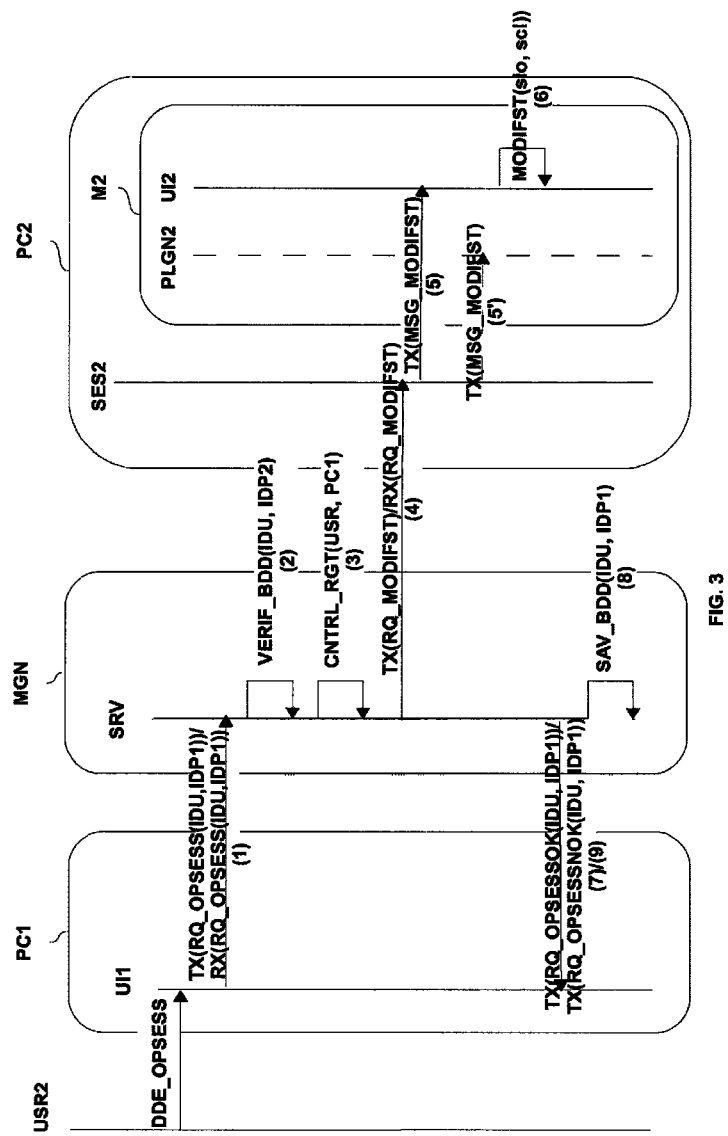
FIG. 3 is a diagrammatic representation of the exchanges of requests and messages between a first machine and session checking means of the computer system of FIG. 2a, according to non-limiting embodiment of the method for opening a session shown in FIGS. 1a to 1c.

In a first non-limiting embodiment, session status modification application message MSG_MODIFST is sent directly to session management user interface UI2 of session management module M2, as is shown by a solid arrow in FIG. 3 (step TX(MSG_MODIFST)). Upon receipt of this message, said interface UI2 calls a low-level session status modification function, FCTv(slo) for the locking function or FCTc(scl) for the closing function, of the operating system (not shown) of said second machine PC2.

In a second non-limiting embodiment, session status modification application message MSG_MODIFST is sent to a plugin PLGN2 of session management module M2, as shown by a discontinuous arrow in FIG. 3 (step TX(MSG_MODIFST)). Plugin PLGN2 then sends a request to session management user interface U12 of session management module M2. Upon receiving this request, interface UI2 calls low-level session status modification function, FCTv(slo) for the locking function or FCTc(scl) for the closing function, of the operating system (not shown) of said second machine PC2.

The use of a plugin PLGN2 avoids having to modify the existing session management user interface in a machine to integrate a function for receiving an application message MSG_MODIFST or replacing it with a new session management user interface that integrates the function for receiving an application message MSG_MODIFST, as is the case in the first embodiment described in the preceding.

In a non-limiting example, the low-level session status modification functions, FCTv(slo), FCTc(scl) are located in a dynamic link library. Depending on the operating system types, this library will have a different extension (for example .dll for "dynamic link library"; .so for "shared object"; .dylib for "dynamic library"; .a for "archive"; .si for "shared library"; .sa for "archive"). Such libraries are known to one skilled in the art and will not be described in greater detail here.

In another non-limiting example, the low-level session status modification functions, FCTv(slo), FCTc(scl) are binary functions. In this case, unlike the dynamic link libraries, when they are used session management user module M2 has to be recompiled.

Accordingly, in a sixth step 6), upon receipt of session status modification application message MSG_MODIFST, said session management module M2 carries out said session status modification (step MODIFST(slo, scl), as shown in FIGS. 1b, 1c, 1d and FIG. 3).

Session management user module M2 is a suite of computer software products with which it is possible to perform the function of user session management and particularly that of modifying session statuses.

In particular, this session status modification is carried out by session management user interface UI2 with low-level function FCTv(slo) or FCTc(scl) as explained in the preceding.

Thus, in the given example, the session opened by user USR on second machine PC2 is either locked (locked status ST=slo) or closed (closed status ST=scl).

It should be noted that when the user session is locked, this means that the user is unable to carry out any actions at all except from the keyboard of second machine PC2, via which the only action possible is to reactivate the user session by entering the user ID and password associated with user USR.

In a seventh step 7), if the session status of second machine PC2 is modified, session checking service SRV sends a request for authorization to open a session RQ_OPSESSOK to first machine PC1.

Finally, a session is opened on first machine PC1. It will be noted that first machine PC1 is also equipped with a session management module M1, as shown in FIG. 2a and FIG. 2b, which is designed to open a session upon receipt of a request to authorize opening of a session (not represented) by session checking service SRV. This session management module M1 comprises session management user interface U11.

It will be noted that in a non-limiting embodiment, when first machine PC1 includes a security service SES1, said security service receives this request to authorize session opening RQ_OPSSSOK.

In an eighth step 8), session checking service SRV, stores said at least one item of identification information IDU of said user USR associated with an items of identification data IDP of said first machine PC1 in said repository BDD.

It is thus possible to record the fact that user USR has opened a session on first machine PC1.

In a non-limiting example, repository BDD is an LDAP directory that is managed by an administrator of machine set GRP.

It will be noted that following receipt of a session status modification application message MSG_MODIFST such as is described in step 6), a session status modification corresponding to closing a session of second machine PC2 may fail if an application is open and will not terminate, for example when documents are already open in this session. In this event, it will be noted that the session closing type is classic, that is to say it does not force an application to close.

In this case, in a ninth step 9), in a first non-limiting embodiment, if the session status modification of second machine PC2 fails, session checking service SRV sends a request to prohibit opening of a session RQ_OPSESSOK (step TX(RQ_OPSESSNOK(USR, IDP1) to first machine PC1, as shown in FIGS. 1a to 1c and FIG. 3).

Figure 1D:
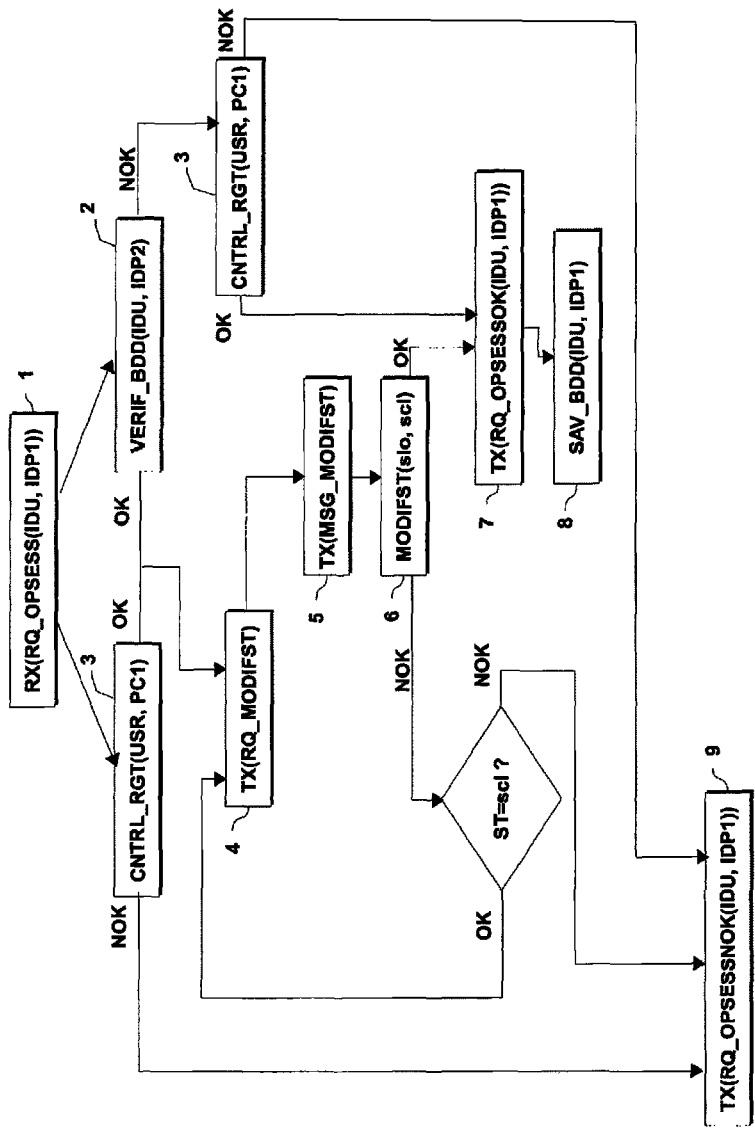
FIG. 1d is a flowchart of the method for opening a session according to a second, non-limiting embodiment of the invention.

In a second non-limiting embodiment, such as is illustrated in FIG. 1d, if the modification of the session status of second machine PC2 corresponding to a session closure fails, session checking service SRV sends a session status modification request RQ_MODIFST of second machine PC2 to said security service SES2 of said second machine PC2 that is of type Tp session locking (ST=slo). Steps 4) to 8) described in the preceding are then performed. Thus, if a session fails to close, at least the session on second machine PC2 is locked.

It will be noted that the steps of verification and sending the session status modification request described in the preceding are carried out for every machine PC that belongs to machine set GRP and is not the first machine. Accordingly, in the machine set there will only be one user session for a given user that will be unlocked, that is to say open. The machines in machine set are thus rendered secure. A third party will not be able to use the user's user session illicitly when the user is no longer using his session, and the machines will not be rendered needlessly unavailable by inactive user sessions.

Thus, the method for opening a session avoids several sessions in the name of the same user from being unlocked on several machines at the same time (when the session status modification is locking). This enables access to the applications on the machines to be rendered secure.

Similarly, the method for opening a session avoids several sessions in the name of the same user from being open on several machines at the same time (when the session status modification is closing). This prevents the machines from being active unnecessarily.

The method for opening a session is implemented by session checking means SRV for a set of machines PC1, PC2 that are designed to be able to open a session of a first machine PC1, said machine set including at least said first machine PC1 and a second machine PC2, said second machine PC2 comprising security means SES2.

The session checking means SRV are designed to:
receive a request to open a session RQ_OPSESS of said first machine PC1, said request including at least one item of identification information IDU for a user USR;
verify whether said at least one item of identification information IDU for said user USR is associated with an identification data item IDU of said second machine PC2 in a repository BDD;
check whether user USR has the right to open a session on first machine PC1;
if said verification and check are positive, transmit to said security means SES2 of said second machine PC2 a session status modification request RQ_MODIFST of said second machine PC2;
if the modification of the session status of second machine PC2 is carried out, send a session opening authorization request RQ_OPSESSOK to first machine PC1; and
store in said repository BDD the at least one item of identification information IDU of said user USR that is associated with an item of identification data IDP of said first machine PC1.

Figure 4:
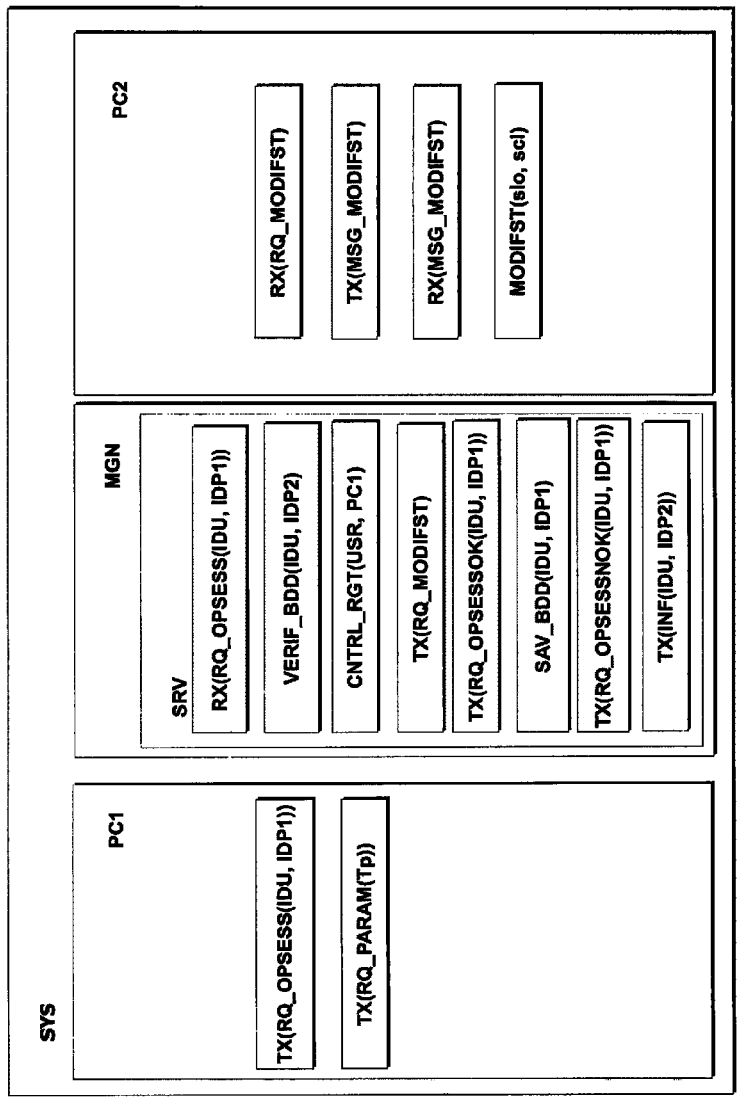
Figure 5:
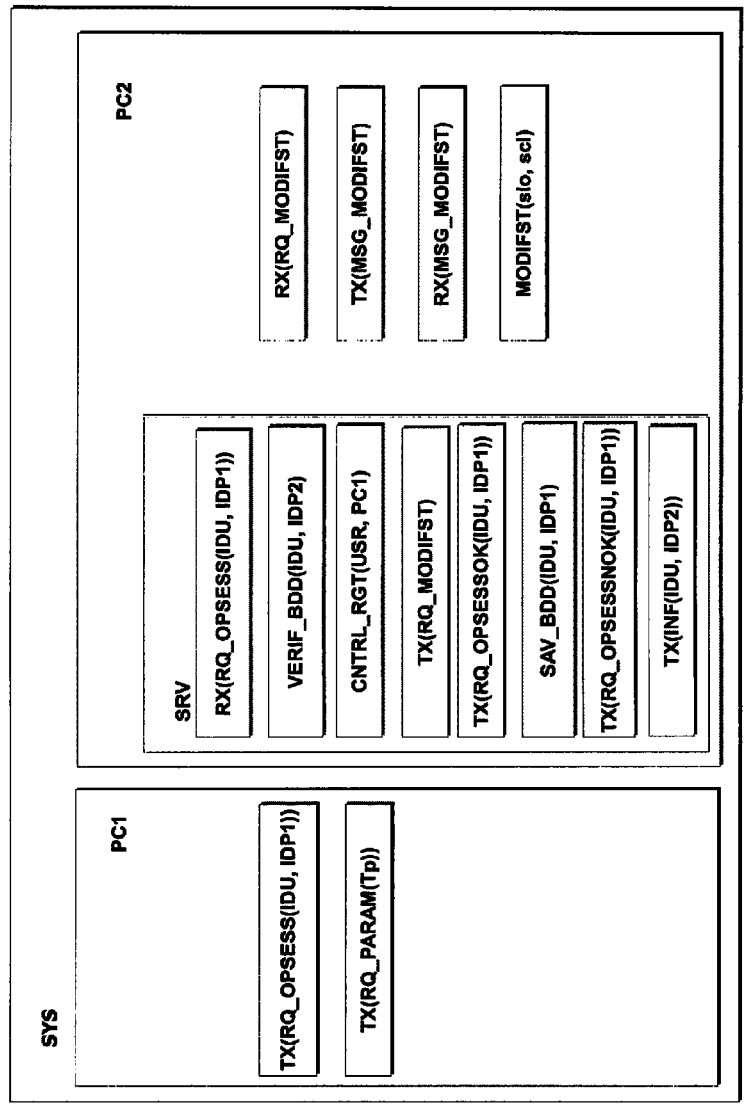

A computer system SYS designed to perform carry out session opening of a first machine PC1 by session checking means SRV for a set of machines PC1, PC2 including at least said first machine PC1 and a second machine PC2, said second machine PC2 comprising a session management module M2, is represented according to a first non-limiting embodiment in FIG. 2a and FIG. 4, and according to a second embodiment in FIG. 2b and FIG. 5.

Computer system SYS comprises:
session checking means SRV designed to cooperate with first machine PC1 and second machine PC2;
said second machine PC2 being designed to receive a session status modification request RQ_MODIFST from session checking means SRV via said security means SES2; and
said first machine PC1 designed to:
transmit a session opening request RQ_OPSESS to said session checking means SRV; and
if the session status of second machine PC2 is modified, to receive a session opening authorization request RQ_OPSESSOK from said session checking means SRV.

In a first non-limiting embodiment, a management machine MGN of a set of machines PC1, PC2 comprises said session checking means SRV as represented in FIGS. 2a, 3 and 4. It is thus designed to cooperate with first PC1 and second machine PC2. Management machine MGN is therefore capable of carrying out a session opening on a first machine PC1 via session checking means SRV for said set GRP of machines PC1, PC2 including at least said first machine PC1 and a second machine PC2, said second machine PC2 comprising security means SES2.

Management machine MGN, first machine PC1 and second machine PC2 together constitute computer system SYS.

In a second non-limiting embodiment, second machine PC2 includes said session checking means SRV, as represented in FIGS. 2b and 5.

In a non-limiting embodiment represented in FIG. 2a and FIG. 2b by dashes and boxes indicated with dashed lines, session management module M2 of second machine PC2 comprises:
a plugin PLGN2 designed to receive a session status modification application message MSG_MODIFST corresponding to a ant a session status modification request RQM_ODIFST sent by session checking means SRV; and
a session management user interface UI2 designed to be requested by said plugin PLGN2 to modify the session status of said second machine PC2.

Of course, the description is not limited to the application, the embodiments or the examples described in the preceding.

Accordingly, in a non-limiting embodiment, the transmission of a request RQ may be performed by a communications protocol other than TCP/IP or UDP. Any communications protocol that enables data to be exchanged between several machines via a computer network may be used.

Accordingly, the described method may be used in applications other than described application in the medical institution field. For example, it may be applied in the context of a machine set:
of a nuclear power plant,
of a telephone network,
of a railway network,
in a control tower,
in a bank of lifts, etc. . . . . .
and generally in any application in which it is possible for the same user to open a session on several machines.

Accordingly, the described invention particularly offers the following advantages:
it is simple to implement;
it enables user sessions opened on different machines by the same user to be locked or closed in centralised manner via the session checking service;
it thus enables the machines belonging to the same machine set to be rendered secure (when the session status modification is one of locking or closure);
it enables the number of resources in use (machines, applications, etc.) to be reduced (when the session status modification is one of closure);
it mitigates the consequences of a user's forgetting to lock or close his session on a machine;
it is rendered secure by the activity of the security services SES1, SES2 of the first and second machine respectively, which are located externally to session management user module M1, M2 and are thus independent thereof; and
it offers the choice between closing and locking a session, this choice being determined either in advance by configuration, or by the user himself.

The invention claimed is:
1. A method for opening a session of a first machine using session checking means for a machine set, the machine set comprising at least the first machine and a second machine, in which the second machine comprises security means, the method comprising:
receiving, by the session checking means, a request to open the session on the first machine, the request comprising at least one item of identification information of a user;
verifying, by the session checking means, that the at least one item of identification information of the user is associated with an item of identification data of the second machine in a repository; and checking, by the session checking means, whether the user has the right to open the session on the first machine, wherein, in response to the verification and check results being positive, sending, by the session checking means, to the security means of the second machine a session status modification request for locking an existing session on the second machine that was previously opened by the user, in response to the session status of the second machine being modified, sending, by the session checking means, to the first machine a request to authorize opening of the session on the first machine, storing, by the session checking means, the at least one identification information item for the user that is associated with an item of identifying data of the first machine in the repository, and sending, by the first machine to the session checking means, a configuration request that includes a type of the session status modification request, the type of the session status modification request corresponding to the locking of the existing session.

2. The method for opening a session according to claim 1, wherein the type of the session status modification request is configured in the session checking means.

3. The method for opening a session according to claim 1, comprising sending, by the session checking means to the security means of the second machine, an additional session status modification request for locking the existing session on the second machine if the session status modification request for locking the existing session on of the second machine fails.

4. The method for opening a session according to claim 1, wherein a request received or transmitted by the session checking means is a TCP/IP or UDP request.

5. The method for opening a session according to claim 1, comprising sending a session status modification application message corresponding to the session status modification request to a session management module of the second machine.

6. The method for opening a session according to claim 1, comprising sending a session status modification application message corresponding to the session status modification request to a plugin of a session management module of the second machine.

7. The method for opening a session according to claim 1, wherein the verification and sending the session status modification request are carried out for any machine that belongs to the machine set and is different from the first machine.

8. The method for opening a session according to claim 1, wherein upon receipt of the session status modification request by the security means of the second machine, said security means of the second machine sends to a session management module of the second machine a session status modification application message corresponding to the session status modification request.

9. A non-transitory computer readable medium comprising one or more sequences of instructions executable by an information processor, the execution of said instruction sequences enabling implementation of a session opening method according to claim 1.

10. A management machine of a set of machines configured to carry out a session opening on a first machine by session checking means for the set of machines, comprising at least the first machine and a second machine, the second machine including security means implemented in the second machine, the management machine including the session checking means in which the session checking means is configured to:

receive a request to open a session of the first machine, the request including at least one item of identification information of a user;

verify whether the at least one item of identification information of the user is associated with an identification data item of the second machine in a repository;

check whether the user has the right to open the session on the first machine, wherein, in response to the verification and check results being positive, transmit to the security means of the second machine, a session status modification request for locking an existing session on the second machine that was previously opened by the user, in response to the session status of the second machine being modified, send a request to the first machine to authorize session opening on the first machine; and store in the repository the at least one item of identification information of the user that is associated with an item of identification data of the first machine, receive, from the first machine, a configuration request that includes a type of the session status modification request, the type of the session status modification request corresponding to the locking or closing of the existing session.

11. The management machine according to claim 10, wherein upon receipt of the session status modification request by the security means of the second machine, said security means of the second machine sends to a session management module of the second machine a session status modification application message corresponding to the session status modification request.

12. A computer system that is configured to carry out a session opening of a first machine via session checking means for a set of machines that includes at least the first machine and a second machine, the session checking means implemented on a third machine or in the second machine, the second machine comprising security means, the system comprising:

the session checking means configured to cooperate with the first machine and the second machine, the session checking means being configured to:

receive a request to open a session on the first machine, the request comprising at least one item of identification information of a user;

verify that the at least one item of identification information of the user is associated with an item of identification data of the second machine in a repository;

check that the user has the right to open the session on the first machine, wherein, in response to the verification and check results being positive, transmit to the security means of the second machine, a session status modification request for locking an existing session on the second machine that was previously opened by the user;

in response to the session status of the second machine being modified, send a request to the first machine for authorization to open the session on the first machine; and store in the repository the at least one item of identification information of the user that is associated with an item of identification data of said first machine;

the second machine being configured to receive a session status modification request from the session checking means via said security means; and the first machine being configured to:

transmit a request to open the session to the session checking means;

in response to the session status of the second machine being modified, to receive a request for authorization to open the session from the session checking means, and transmit, to the session checking means, a configuration request that includes a type of the session status modification request, the type of the session status modification request corresponding to the locking of the existing session.

13. The computer system according to claim 12, wherein the second machine comprises a session management module that includes a plugin.

14. A computer system according to claim 12, wherein upon receipt of the session status modification request by the security means of the second machine, said security means of the second machine sends to a session management module of the second machine a session status modification application message corresponding to the session status modification request.

15. A method for opening a session of a first machine using a session checking service for a set of machines comprising the first machine and a second machine, the second machine comprising a security service, the method comprising:

receiving, by the session checking service, a request to open the session on the first machine, the request comprising an item of identification information of a user;

verifying, by the session checking service, that the item of identification information of the user is associated with an item of identification data of the second machine in a repository;

checking by the session checking service that the user has the right to open the session on the first machine, wherein, in response to the verification and check results being positive, sending, by the session checking means, a session status modification request, to the security service of the second machine for locking an existing session on the second machine that was previously opened by the user, in response to the session status of the second machine being modified, sending, by the session checking means, to the first machine a request to authorize opening of the session on the first machine, storing the identification information item for the user that is associated with an item of identifying data of the first machine in the repository by the session checking service, and sending, by the first machine to the session checking service, a configuration request that includes a type of the session status modification request, the type of the session status modification request corresponding to the locking of the existing session.

16. The method for opening a session according to claim 15, wherein upon receipt of the session status modification request by the security service of the second machine, said security means of the second machine sends to a session management module of the second machine a session status modification application message corresponding to the session status modification request.

* * * * *